United States Patent [19]

Kulisz

[11] Patent Number: 5,017,226

[45] Date of Patent: May 21, 1991

[54] INK AND METHOD FOR THE DEVELOPMENT OF CONCEALED IMAGES

[75] Inventor: Michael Kulisz, Roselle, Ill.

[73] Assignee: A. B. Dick Company, Chicago, Ill.

[21] Appl. No.: 252,675

[22] Filed: Oct. 3, 1988

[51] Int. Cl.[5] .............................................. C09D 11/00

[52] U.S. Cl. .......................................... 106/21; 106/19; 106/14.5

[58] Field of Search ............................ 106/19, 21, 14.5

[56] References Cited

U.S. PATENT DOCUMENTS

| | | | |
|---|---|---|---|
| 3,620,744 | 11/1971 | Schellenberg et al. | 430/462 |
| 3,632,364 | 1/1972 | Thomas et al. | 106/21 |
| 3,788,863 | 1/1974 | Scheuer | 106/21 |
| 4,051,283 | 9/1977 | Thomas et al. | 106/21 |
| 4,853,321 | 8/1989 | Momoki et al. | 430/489 |

*Primary Examiner*—William R. Dixon, Jr.
*Assistant Examiner*—Helene Klemanski
*Attorney, Agent, or Firm*—Leydig, Voit & Mayer

[57] ABSTRACT

Disclosed is a system for developing latent images on alkali-based or acid-based paper stock which has been marked with a water-soluble oxidizing agent to form a concealed image. In the system, a marking composition is applied to said paper stock which comprises (a) A water-soluble iodide,
(b) Acetic acid,
(c) A water-soluble reducing agent, and
(d) Water.

Preferably, the reducing agent is ascorbic acid and preferably the marking composition also comprises a water-soluble dye.

4 Claims, No Drawings

INK AND METHOD FOR THE DEVELOPMENT OF CONCEALED IMAGES

This invention relates generally to materials, elements and methods used in informational systems and testing systems and in particular to such systems embodying concealed images or a combination of concealed and visible images, and to the preparation and development thereof, for use with both alkali-based and acid-based paper stock.

BACKGROUND OF THE INVENTION

Concealed image development is used in self-instructional material, self-examination and multiple choice techniques for learning, testing and the like. In such self-instructional material for example, only the image corresponding to the correct answer contains one or more components for latent visual development. When properly marked with a writing substance embodying an additional component or components required for color development, the image develops thereby indicating that the correct answer has been marked. For further utilization of these concepts in concealed image development, reference can be made to U.S. Pat. No. 3,451,143.

Prior art systems, such as the ones described in U.S. Pat. Nos. 3,632,364 and 3,788,863, have utilized a three component system, comprised of a copy sheet, an ink or marking material, and an oxidation agent which is applied to the copy sheet. While these systems, and particularly the ink or marking material, have been successful when the copy sheet is produced from an acidic-based paper, the same results are not achieved when an alkali-based paper is substituted. Specifically, the marking material is ineffective in developing latent images that have been placed onto the alkali-based copy sheet. As world paper production is moving at an increasing rate toward increasing production of alkali-based paper stock, such as that employing calcium carbonate filler, it has become necessary to develop a latent image marking system that will work satisfactorily on either acidic-based or alkali-based copy sheets.

Therefore, it is an object of the present invention to provide a marking system for developing concealed images that is effective in producing a visible image from a latent image which has been placed on either acidic-based or alkali-based paper stock.

A further object is to provide a relatively non-toxic marking material for use in developing latent images on alkali-based paper stock.

SUMMARY OF THE INVENTION

There has now been discovered a marking material for use in developing concealed images which have been formed from a water-soluble oxidizing agent on either alkali-based or acid-based paper stock which contains starch, polyvinyl alcohol, or a mixture thereof, wherein said marking material comprises:

(a) A water-soluble iodide;

(b) Acetic acid;

(c) A water-soluble reducing agent; and (d) Water, wherein the amount of reducing agent is sufficient to maintain essentially all of the iodide in reduced state prior to applicantion to said paper stock. Optionally, the marking material may also contain a water-soluble or water-dispersible dye.

There has also been discovered a method for developing a concealed image on alkali-based paper stock containing starch, polyvinyl alcohol, or a mixture thereof, which has been marked with a water-soluble oxidizing agent to form a concealed image, wherein the method comprises contacting the portion of the paper stock containing the concealed image with a marking composition which comprises:

(a) A water-soluble iodide, (b) Acetic acid, (c) A reducing agent, and (d) Water, wherein the amount of reducing agent in said marking composition is sufficient to maintain essentially all of the iodide in reduced state prior to application to said paper stock and wherein the amount of oxidizing agent present in said concealed image is sufficient to convert the iodide to iodine which subsequently reacts with the starch, polyvinyl alcohol, or both, to visually develop said image.

DETAILED DESCRIPTION OF THE INVENTION

While the invention will be described in connection with certain preferred embodiments, it is not intended to limit the invention to those particular embodiments. On the contrary, it is intended to cover all alternatives, modifications, and equivalent arrangements as may be included within the spirit and scope of the invention as defined by the appended claims.

The present system employs three general components: (1) a marking composition which comprises an aqueous solution of a water-soluble iodide, optionally a water-soluble or water-dispersible dye or pigment, acetic acid, and a reducing agent for the iodide to maintain it in reduced state; (2) an oxidizing agent capable of oxidizing the iodide to yield iodine; and (3) a receiving paper stock material containing starch or polyvinyl alcohol which reacts with the released iodide to form an intensely colored product.

The invention will be described with reference to the distribution of the three components of the system in the elements of a spirit duplicating copy process for the production of multiple copies containing a concealed image for subsequent development and a marking material with which the copy sheets can be marked for visible development of the image. It will be understood that the three components can be otherwise distributed in elements for producing multiple copies by other printing processes, such as by stencil duplication, lithographic printing, letterpress printing, flexographic printing, gravure printing, screen printing and the like, or by hand stamp, as will hereinafter be defined.

The marking composition is made of an aqueous solution comprised of a water-soluble iodide, acetic acid, a reducing agent, and preferably a water-soluble or water-dispersible dye or pigment. The iodide component is preferably an ammonium or an alkali metal iodide, such as potassium iodide, sodium iodide, and the like. Colored iodide salts capable of being oxidized to release iodine may also be used. The acetic acid component of the marking material is present to provide the proper environment for the liberation of iodine. Other agents, such as phosphoric acid could be used in place of acetic acid, but are not preferable. Numerous differing types of water-soluble or water-dispersible coloring agents may be used successfully in the ink material, including, for example, tetrazine dye. If the marking material is to placed in a pen or other type of writing instrument, it is preferable to use a dye which has been approved for human consumption or has been found to be non-toxic.

In addition to the components listed above, a reducing agent should be present in an amount sufficient to prevent the iodide from being converted to iodine during storage. Preferably the reducing agent is ascorbic acid. Further, enhanced results have been noted upon the addition of a combined bactericide or a combined bactericide, and reducing agent, such as DXN, to the marking material. The function of the reducing agent is to prevent the unwanted presence of iodine in the ink which would then cause release of iodine into the background (non-imaged) areas of the paper stock, which would detract from the production of a sharp and distinct image. DXN releases aldehyde as its active ingredient, acting both as a bactericide and as a supplemental stabilizer or reducing agent, a function similar to that of the ascorbic acid.

Generally, the amount of iodide in the marking material will be from about 1 to about 10 percent, the amount of acetic acid will be from about 1 to about 5 percent, the amount of reducing agent will be from about 0.025 to about 0.5 percent, the amount of colorant, if present, will be from about 0.1 to about 0.5 percent, and the amount of preservative, if present, will be from about 0.05 to about 0.5 percent, all by weight.

As the component which reacts with the released iodide to produce a visible image, use is made of a material that is invisible in the copy sheet and, for such purpose, it is preferred to make use of a starch or polyvinyl alcohol or mixture thereof, which is invisible when embodied in the desired amounts in the copy sheet.

As the oxidizing agent, it is desirable to make use of a material which is invisible in the copy sheet, thereby enabling its use in defining the invisible image. For this purpose, it is preferred to make use of a soluble salt of copper, such as the chloride, nitrate, sulphate, acetate, lactate, benzoate, or stearate of copper. Use can also be made of a double salt, such as $CuCl_2 \cdot KCl$ and cupric ammonium chloride. Alternatively, use can be made of such other oxidizing agents as copper-m-benzene disulfonate and the like.

Copper chloride and related salts are highly hygroscopic or deliquescent such that difficulties are sometimes encountered in their use under conditions where high humidity is present, such as the type prevailing in the southern regions of the United States, as well as on hot and humid summer days in the rest of the country. The stability of such copper salts can be greatly improved by combining these salts with the copper salts of the type previously described. Excellent results are also secured by combining the copper salts with an amine such as piperidine, piperazine, phenylenediamine, tallowamine, trichloromelamine, trusopropanolamine, melamine and the like.

For the preparation of the copy paper, in accordance with the preferred practice of this invention, the oxidizing component is embodied in the transfer coating of the transfer sheet for use in imaging a spirit master. The starch or polyvinyl alcohol preferably is embodied in the copy sheet. In an alternate embodiment the starch and/or polyvinyl alcohol, can be incorporated with the iodide in the marking material.

Having described the basic concept of this invention, illustration will now be made of the distribution of the elements in the preparation of copy paper by spirit duplication and in the use thereof to develop the invisible image.

EXAMPLE 1

Copy Paper

In the preparation of the copy paper, it is sufficient if the copy paper is formulated to contain at least 0.1% by weight starch and/or polyvinyl alcohol, although it is preferable to make use thereof of an amount within the range of 0.5% to 5% by weight of the copy paper. The starch or polyvinyl alcohol can be uniformly distribution throughout the copy paper by incorporating either or both as a component of the copy which is dissolved or dispersed in the slurry or finish of which the paper is produced. The copy is then formed by conventional paper making techniques using the starch and/or polyvinyl alcohol slurry. In the preferred practice, the starch and/or polyvinyl alcohol is incorporated into already formed paper by impregnation, preferably by coating the paper with a solution containing from 3-10% by weight aqueous starch or polyvinyl alcohol whereby the starch or polyvinyl alcohol is concentrated on the surface of the paper where it is readily available for reaction with the released iodine. Consistent with the present invention, either acidic or alkaline-based paper or slurry may be utilized in the preparation of the copy paper.

EXAMPLE 2

Transfer Sheet

The transfer sheet embodying the oxidizing agent in the transfer coating can be prepared using the conventional method for the preparation of transfer sheets in spirit duplication. The following is a typical formulation for a transfer coating into which the oxidizing material of the present invention is incorporated:

EXAMPLE 2-a

| | Percent by weight |
|---|---|
| Oxidizing agent | 5-50 |
| Dioctyl phthalate | 8 |
| Ethyl cellulose (Hercules N4) | 2.5 |
| Toluene | 40 |

EXAMPLE 2-b

| | Parts by weight |
|---|---|
| Copper chloride | 10 |
| Dioctyl phthalate | 8 |
| Ethyl cellulose | 2.5 |
| Toluene | 40 |

EXAMPLE 2-c

| | Parts by weight |
|---|---|
| Trichloromelamine | 25 |
| Dioctyl phthalate | 8 |
| Ethyl cellulose | 2.5 |
| Toluene | 40 |

The materials are ball milled and then coated onto paper at a rate of 10 to 20 pounds per 3,000 square feet of surface area, calculated on a dry weight basis.

As the oxidizing agent in Examples 2 and 2-b, the copper chloride can be replaced by equivalent amounts of copper nitrate, copper sulphate, copper acetate, copper lactate, copper benzoate, copper-m-benzene disulfonate, or $CuCl_2 \cdot KCl$ with the copper salt being present preferably in an amount within the range of 5–25 parts by weight.

Instead of making use of a copper salt in Example 2, use can be made of a mixture of copper salts and an amine such as piperidine, piperazine, phenylenediamine, tallowamine, trichloromelamine, trusopropanolamine, melamine and the like, in the ratio of 1 part by weight copper salt to 0.1 to 2 parts by weight of the amine and preferably 1 part by weight of the copper salt to 0.4 to 2 parts by weight of the amine.

EXAMPLE 3

Marking Material

The following is a typical formulation of a fluid marking material:

| | Parts by weight |
|---|---|
| Iodide | 1–10 |
| Acetic acid | 1–5 |
| Reducing Agent | 0.5 |
| Water | 85–98 |

The above fluid composition can be modified to incorporate a marking dye, such as tetrazine dye in an amount of 0.1 to 1.0 part by weight. The iodide may take the form of potassium iodide, sodium iodide, ammonium iodide, or lithium iodide, with the amount iodide not being critical to the success of the marking material as more of the material may be used.

EXAMPLE 3-a

| | Percent by weight |
|---|---|
| Potassium iodide | 2–6 |
| Dye | 0.1–0.5 |
| Acetic acid | 1–3 |

EXAMPLE 3-b

The aqueous solution of Example 3-a may be modified by the addition of a preservative such as DXN.

| | |
|---|---|
| Potassium iodide | 4 |
| Acetic acid | 2 |
| Tetrazine Dye | 0.2 |
| Ascorbic acid | 0.025 |
| DXN | 0.05 |
| Water | .00 |

EXAMPLE 4

Preparation of copy by spirit duplication

The transfer sheet is positioned with the transfer coating of Example 2 in surface contact with the duplicating surface of a spirit master which is imaged by transfer of coating from the transfer sheet to the master surface in the normal manner in response to impact or pressure from a die, typewriter key, stylus or pencil, or in response to a heat pattern generated by infrared radiation of an infrared ray absorbing original positioned in surface contact with the transfer sheet. The master may be additionally imaged by a conventional spirit master to provide a master imaged in part with a spirit and alcohol soluble dyestuff from an imaged master having a visible image and an invisible image.

For the production of copy paper the imaged master 6 is mounted on the cylinder of a conventional spirit duplicating machine and copy sheets wetted on one surface with a spirit fluid, are brought into surface contact with the imaged surface of the master whereby some of the imaging materials are leached from the image portions of the master for transfer to the copy sheets to produce copies containing an invisible image formed of the oxidizing agent and visible images if the master had an imaged portion containing a dyestuff, or if the copy sheets originally contained a visible image.

Thereafter the copy sheets can be used as a piece of instructional material or test material distributed for use. When the marking fluid of Example 3 is applied to a non-imaged portion of the sheet, only a color introduced by the marking material to indicate the place that has been marked will show. When the marking material is applied to an invisible image, the iodide in the marking material is immediately oxidized by the oxidizing agent in the invisible image to release iodine and the iodine stains or reacts with the starch or polyvinyl alcohol to provide a visible image of high color intensity to indicate that the marking material has been applied to a portion of the copy sheet containing the visible image.

Having described the basic concepts of this invention, reference will now be made to the distribution of components for use in other printing processes for producing multiple copies of the sheet printed with the invisible and visible image.

In the lithographic printing process, the oxidizing material will be formulated as a component of the lithographic ink which preferentially wets the imaged portions of the lithographic surface as distinguished from the non-imaged hydrophilic portions which have been previously wet with water.

In stencil duplication, the oxidizing agent is formulated in the stencil fluid that is forced through the stencil openings onto the copy sheets to form the invisible image thereon.

In letterpress printing, the oxidizing material will be embodied in the fluid with which the letters of the plate are wet for imprinting the copy sheets.

In gravure printing, the oxidizing material will be formulated into the fluid that is retained in the well etched into the surface of the plate for transfer to copy paper brought into contact therewith.

In hand stamp or silk screen printing, the fluid ink should preferably be formulated to contain the oxidizing agent.

In each of these other processes, the ink of the present invention containing the iodide would still be limited to being located in the marking material with which the printed sheet is marked and the polyvinyl alcohol or starch would preferably be in the paper on which the copy is produced. Alternatively, the starch or polyvinyl alcohol could be embodied with the oxidizing agent in the printing fluid or with the iodide in the marking material.

It will be apparent from the foregoing that the present invention provides a new and improved system for use of concealed images in educational, testing and the like programs whereby an invisible image on either acidic or alkaline-based paper can be made highly visible when properly marked with an iodide containing material.

It will be understood that changes may be made in the details of construction, formulation and operation without departing from the spirit of the invention, especially as defined in the following claims.

What is claimed is:

1. A marking material for use in developing concealed images which have been formed from a water-soluble oxidizing agent on either alkali-based or acid-based paper stock which contains starch, polyvinyl alcohol, or a mixture thereof, wherein said marking material comprises:

(a) a water-soluble iodide;

(b) acetic acid;

(c) a water-soluble reducing agent;

(d) a water-soluble or water-dispersible dye or pigment; and (e) water, wherein the amount of the reducing agent is sufficient to maintain essentially all of the iodide in reduced state prior to application to said paper stock.

2. The marking material of claim 1 wherein the water-soluble reducing agent comprises ascorbic acid.

3. The marking material of claim 2 comprising a tetrazine dye.

4. The marking material of claim 4 comprising about 2 percent acetic acid, about 4 percent potassium iodide, about 0.2 percent tetrazine dye, about 0.025 percent ascorbic acid, and about 0.05 percent preservative, all percentages being by weight.

* * * * *